United States Patent [19]

Anderson

[11] Patent Number: 4,746,262
[45] Date of Patent: May 24, 1988

[54] APPARATUS FOR HANDLING AND TRANSPORTING DOUBLE FRAME STRUCTURES

[75] Inventor: Roger K. Anderson, New Middletown, Ind.

[73] Assignee: E. H. Hughes Co., Inc., Louisville, Ky.

[21] Appl. No.: 885,771

[22] Filed: Jul. 15, 1986

[51] Int. Cl.⁴ .............................................. B60P 1/02
[52] U.S. Cl. .................................... 414/495; 414/347; 414/541
[58] Field of Search ............... 414/495, 497, 347, 540, 414/541

[56] References Cited

U.S. PATENT DOCUMENTS

| | | | |
|---|---|---|---|
| 2,929,519 | 3/1960 | Taylor | 414/495 X |
| 3,168,206 | 2/1965 | Washington | 414/495 X |
| 3,451,656 | 6/1969 | Goodacre | 414/495 X |
| 3,712,493 | 1/1973 | Priefert | 414/495 |
| 4,082,195 | 4/1978 | Wnek | 414/495 X |

Primary Examiner—Peter A. Aschenbrenner
Assistant Examiner—Thomas A. Rendos
Attorney, Agent, or Firm—Maurice L. Miller, Jr.

[57] ABSTRACT

An apparatus in the form of a trailer for handling and transporting, in a fully assembled state, a machine having a double frame such as a conventional concrete finishing machine is disclosed. The apparatus features a chassis, a scissors lift mounted on the chassis and a pair of spaced guideways for supporting a double frame thereon rotatably attached to the upper end of the lift. Eye hooks for locking the guideways relative to the chassis to prevent rotation of the guideways while the apparatus is in transport are also disclosed. The disclosed apparatus also features a pair of plates slidably carried in the guideways and an adjustable worm gear assembly for moving the plates within the guideways to transfer the load represented by double frame when loading or unloading the same.

7 Claims, 7 Drawing Sheets

APPARATUS FOR HANDLING AND TRANSPORTING DOUBLE FRAME STRUCTURES

BACKGROUND OF THE INVENTION

This invention relates to an apparatus for lifting, supporting and transporting, in a fully assembled state, machines such as a concrete finishing machines and other machines having double frame structures.

The apparatus of the present invention features means for lifting, lowering, loading and unloading such machines. It also features guideways in which the elongated double frame of the machine rests, which guideways are rotatable in a horizontal plane so as to align the double frame along the frame of the apparatus for transport along a roadway and so as to align the double frame crossways of the apparatus frame for loading and unloading the double frame machine. To this extent, the invention features both lifting and rotational means. Some vehicles known in the prior art employ a single load supporting bed mounted on a chassis for rotation in a horizontal plane and for lifting and lowering relative to the chassis. See for example, the load handling and transporting vehicle disclosed in U.S. Pat. No. 2,812,873 issued to C. B. Coleman on Nov. 12, 1957. The patent to Coleman broadly discloses a truck bed which is both rotatable and liftable relative to the truck chassis. But the reference truck bed also tilts as it is raised and lowered which, while adapted to transporting large containers is not adapted to transporting double frame machinery such as a concrete finishing machine.

By means of my invention, it is now possible to lift and transport an elongate double frame structure of great size and mass such as a concrete finishing machine in fully assembled state without causing damage to the structure. Because the structure need not be disassembled prior to transport and then reassembled at a job site, a great deal of time, labor and expenses can be saved using the present invention.

SUMMARY OF THE INVENTION

It is an object of my invention to provide an apparatus for lifting, supporting and transporting a machine, in an essentially fully assembled state, which contains an elongated double frame.

It is a further object of my invention to provide an apparatus for lifting, supporting and transporting, in an essentially assembled state, a concrete finishing machine.

Briefly, in accordance with my invention, there is provided an apparatus for lifting, supporting and transporting, in a fully assembled state, a machine having an elongated double frame. The apparatus includes a chassis and lifting means attached to the chassis for lifting and lowering a machine. Also included is a pair of spaced channels or guideways for supporting a double frame thereon, which guideways are rotatably attached to an upper end of the lifting means for vertical movement with the lifting means and for rotation relative to said chassis in a horizontal plane. Means for locking the guideways in alignment with the frame to prevent such rotation as, for example, during transport and a pair of plates slidably disposed in the guideways upon with a double frame is adapted to rest is also included. Lastly, the apparatus includes means for moving the plates along the guideways to shift the load presented by the double frame.

These and other objects, features and advantages of the present invention will become apparent to those skilled in the art from a study of the attached drawings and following detailed description by way of which only a single preferred embodiment of my invention is illustrated.

DESCRIPTION OF THE PREFERRED EMBODIMENT

Figure 1:
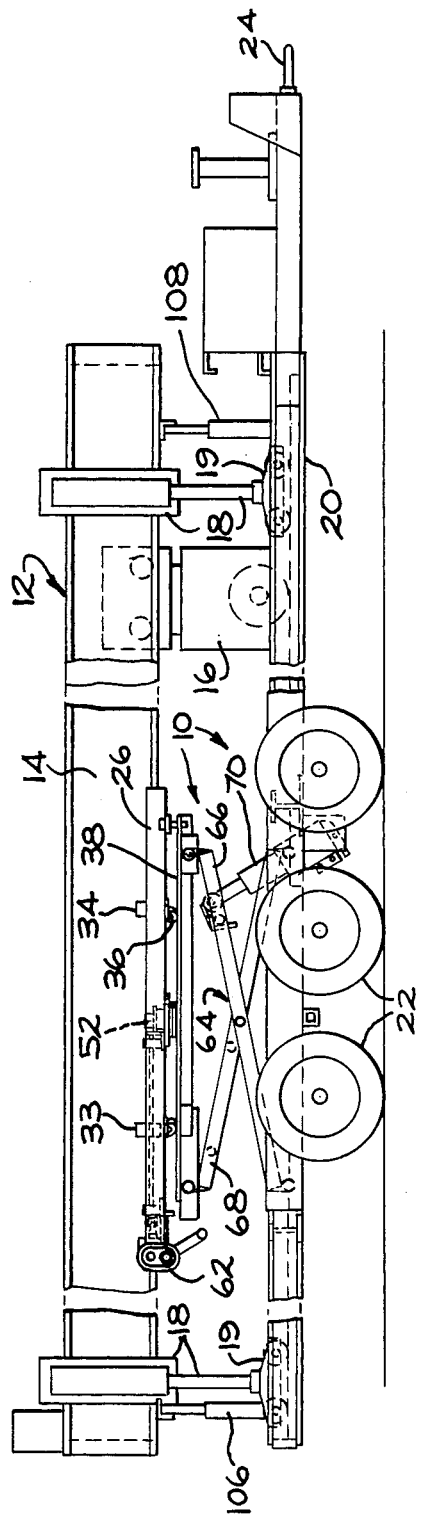
FIG. 1 shows a side elevation view of an apparatus for transporting a concrete finishing machine or the like thereon in a fully assembled state, thus illustrating one preferred embodiment of my invention.

Referring now to the drawing figures, there is shown, in one preferred embodiment of my invention, an apparatus 10 for lifting, supporting and transporting a concrete finishing machine 12 (FIG. 1 only) in a fully assembled state. The finishing machine 12 may be conventional type having an elongated double frame 14 from which is suspended a roller carriage assembly 16 and a pair of supporting standards 18. Such machines are used to finish the surfaces of concrete roadways and have heretofore been transportable between job sites only in a disassembled or broken down state.

Figure 2:
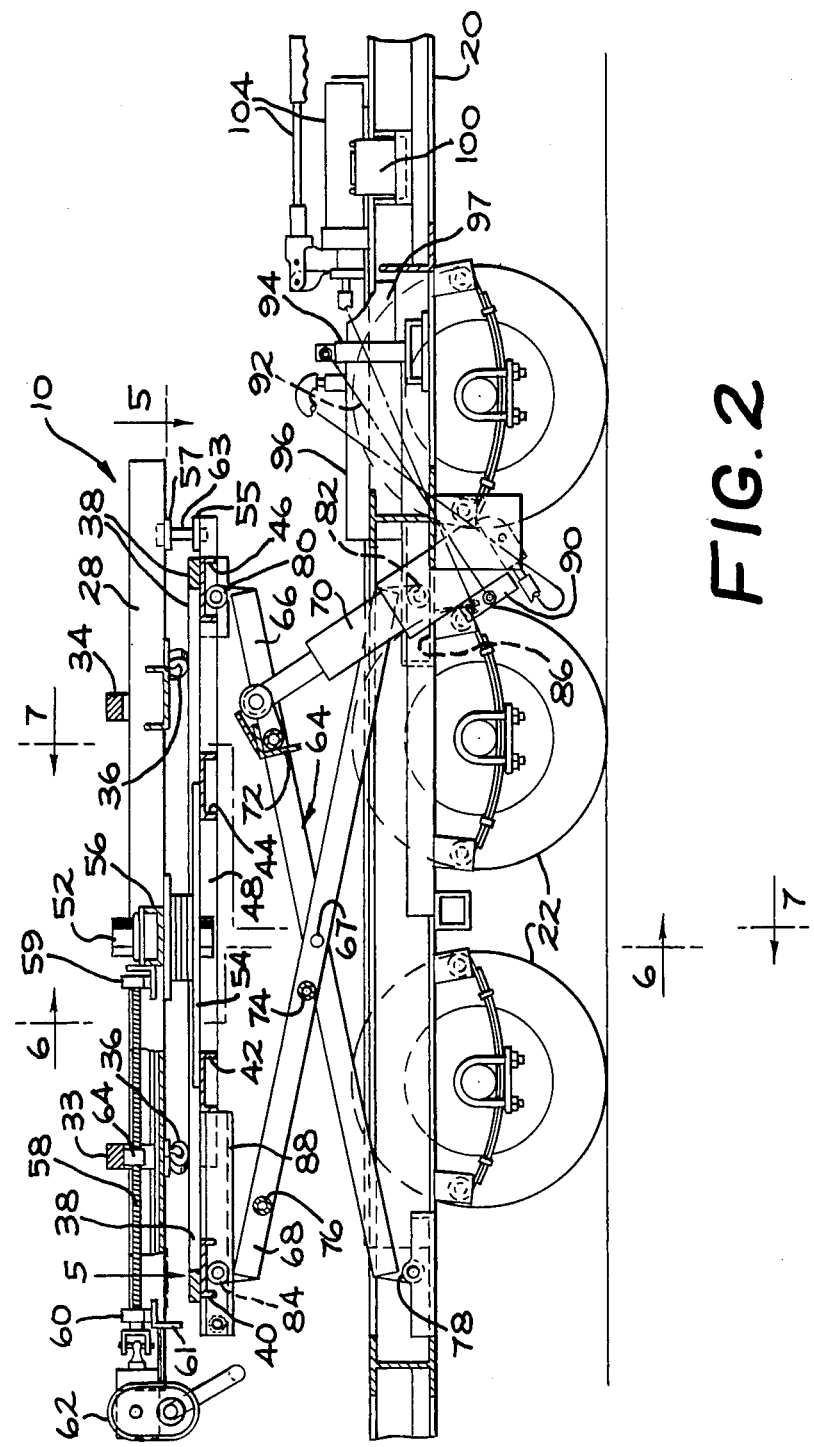
FIG. 2 shows an enlarged side elevation view of a portion of the apparatus of FIG. 1 the same as viewed in the latter figure except with the finishing machine removed and with certain parts torn away to show internal structure.
Figure 3:
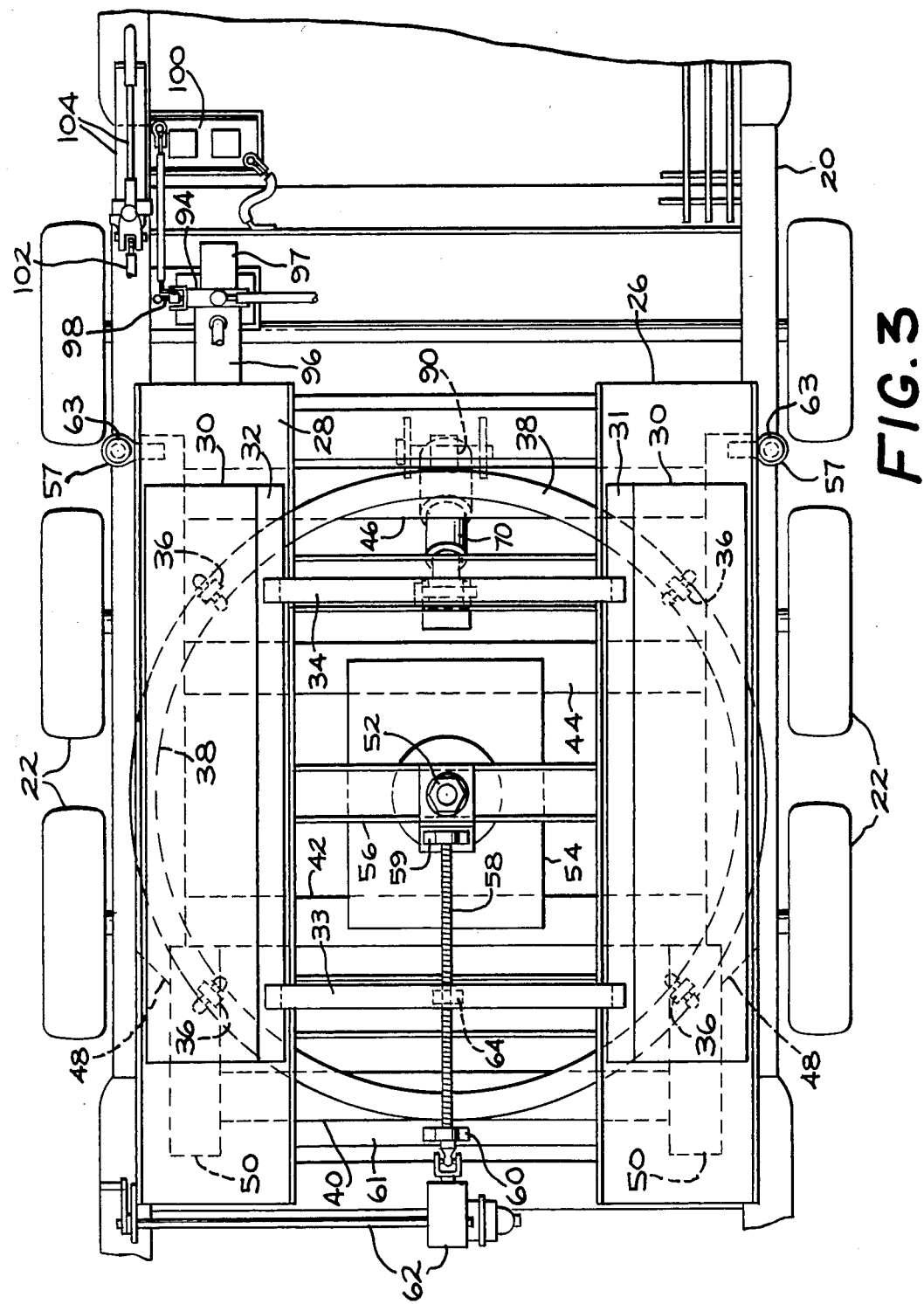
FIG. 3 shows a top plan view of the portion of the apparatus shown in FIG. 2.
Figure 4:
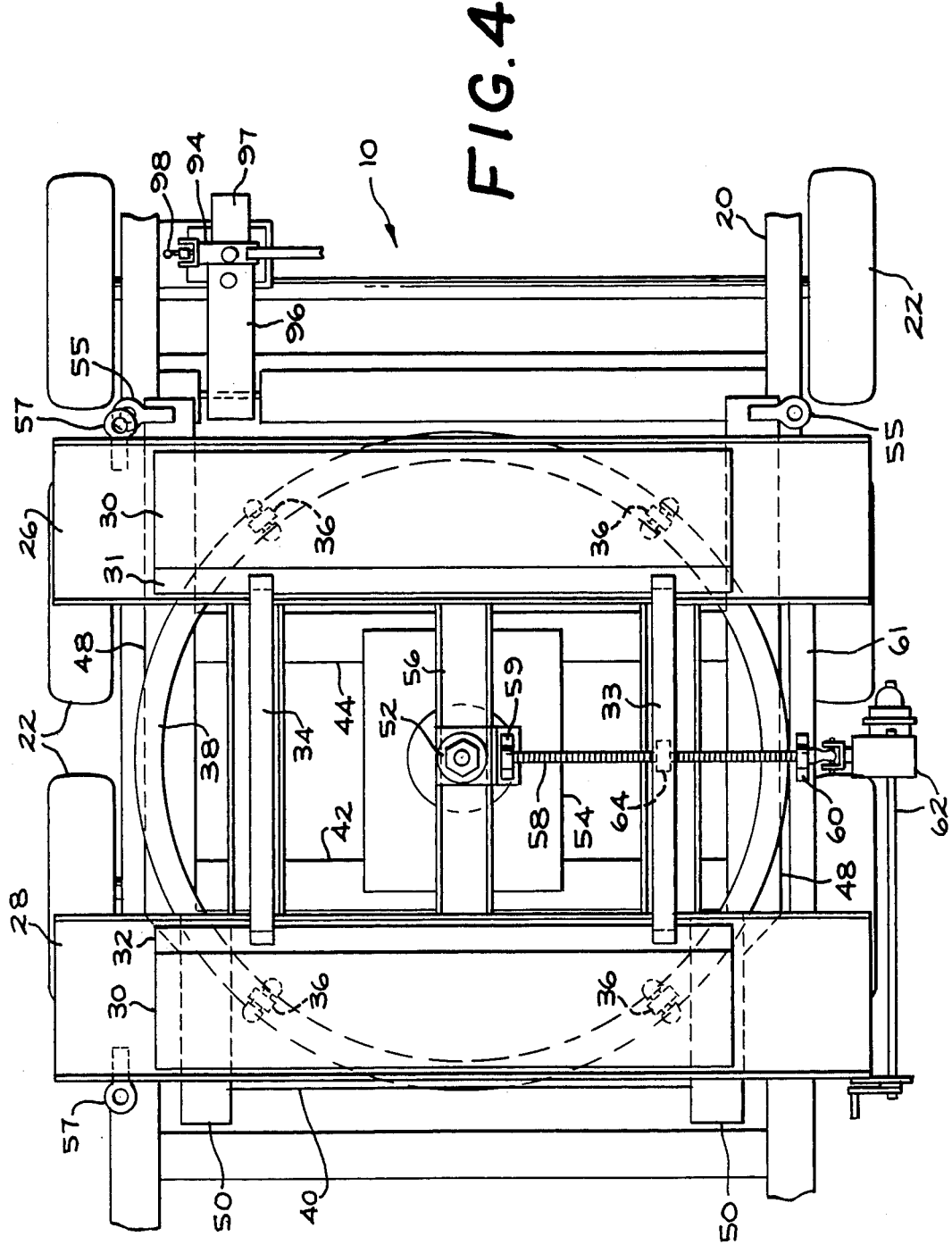
FIG. 4 shows a top plan view of the portion of the apparatus shown in FIG. 2 with certain parts thereof being rotated 90 degrees in a horizontal plane from their positions as viewed in FIG. 3.

The apparatus 10 of the present example is in the form of a trailer having a chassis or frame 20 mounted on wheels 32 for travel overland and on roadways. A forward end of the frame 20 contains a pinal hook 24 (FIG. 1 only) for connection in the usual manner to a pickup truck or other motor vehicle, not shown. The apparatus 10 includes a pair of spaced, parallel channels or guideways 26 and 28 containing elongated rubber or plastic mats 30 overlying a pair of slidable plates 31 and 32 along which the double frame 14 of the finishing machine 12 rests, which plates 31 and 32 are held at a fixed spacing with respect to one another by a pair of rigid cross members 33 and 34. The channels 26 and 28 are rotatably mounted on four casters 36 which ride upon a circular steel track 38 supported upon portions of four channels 40, 42, 44 and 46 and connected side members 48 and 50. A pivot pin assembly 52 connects to and through a plate 54, which plate overlies and is attached to the channels 42 and 44 and thence through a cross member 56 which is, in turn, connected to the channels 26 and 28 to permit the channels to rotate. Rotation of the channels 26 and 28 as, for example, from their positions as shown in FIG. 3 to their positions as shown in FIG. 4, is brought about merely by hand turning the frame 14 of the assembly 12 as in sits in the channels 26 and 28. As shown most clearly in FIG. 4, a first pair of large eye hooks 55 are affixed to forward end portions of the member 48. A second pair of similar eye hooks 57 are connected to the undersides of forward end portions (as viewed in FIG. 3) of the channels 26 and 28 for rotational movement therewith. The eyes of the hooks 57 project upwardly from the sides of the channels 26 and 28 and are adapted to register over the eyes of the hooks 55 when the channels 26 and 28 are in the position shown in FIG. 3 so that bolts or pins 63 (See FIGS. 1 and 2 only) can be inserted through registering pairs of the hooks 55 and 57 to lock the channels 26 and 28 in the traveling position.

An elongated worm gear 58 extends from a collar 59 affixed to a side of the pivot pin assembly 52 to a collar 60 affixed to an upper surface of an angle bracket 61. The bracket 61 is rigidly connected to and between rear end portions of the channels 26 and 28 (See particularly FIGS. 3-4) so that it and the worm geaar 58 will rotate about the assembly 52 as the channels 26 and 28 rotate about the same axis. A handle and gear box 62 attached to the outer end of the worm gear 58 allows manual adjustment of the latter so that a worm 64 threadedly received on a central portion of the gear 58 and trapped within the cross member 33 causes a pressure to bear against the cross member 33 to translate or slide the plates 31 and 32 longitudinally in the channels 26 and 28 a distance of up to about eighteen inches for reasons later explained.

Figure 5:
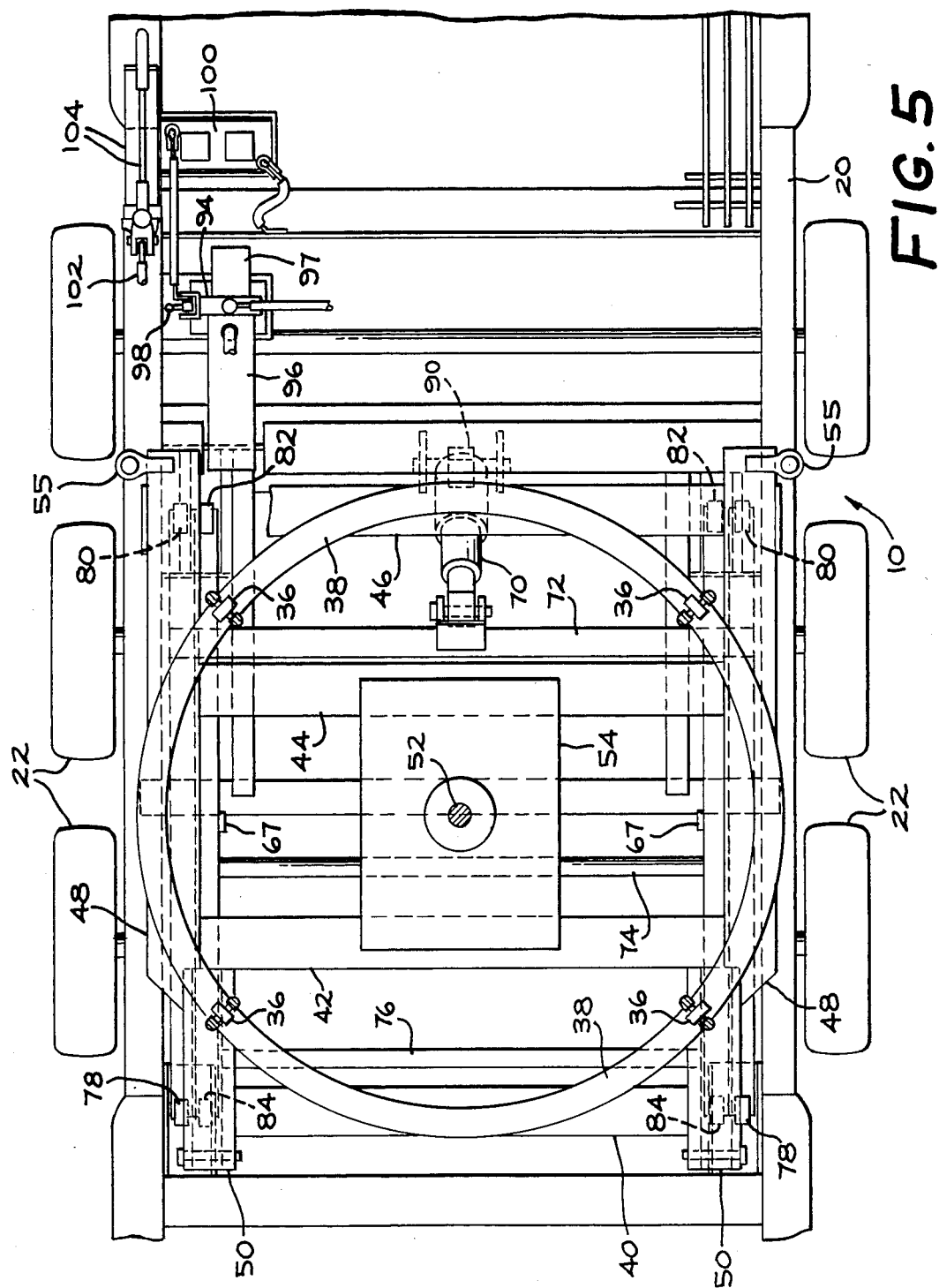
FIG. 5 shows a cross-sectional plan view of the portion of the apparatus shown in FIG. 2 as viewed along cross-section lines 5—5 of the latter figure.
Figure 6:
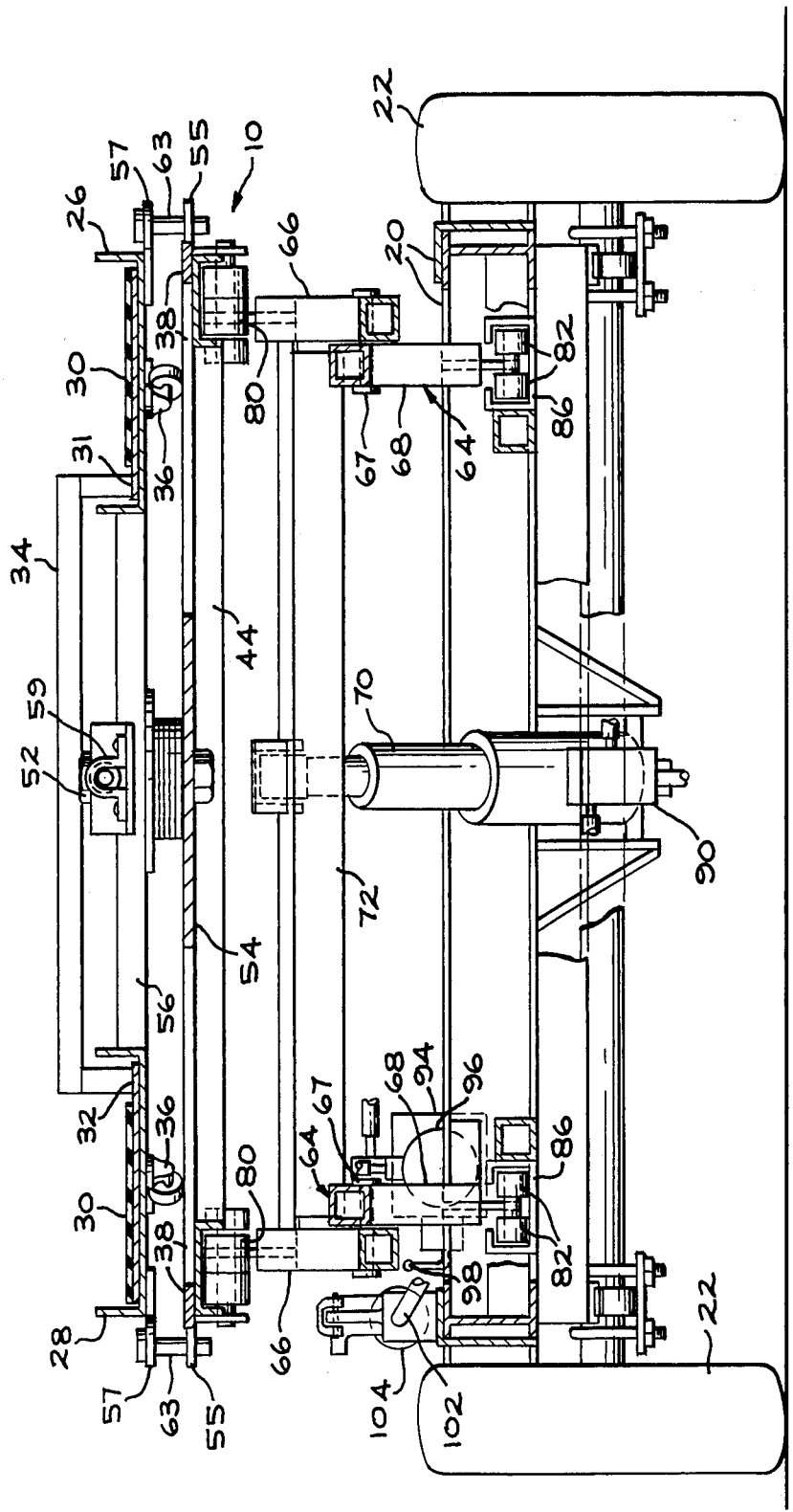
FIGS. 6-7 show cross-sectional elevation views of the portion of the apparatus of FIG. 2 as viewed along cross-section lines 6—6 and 7—7 of the latter figure, respectively.
Figure 7:
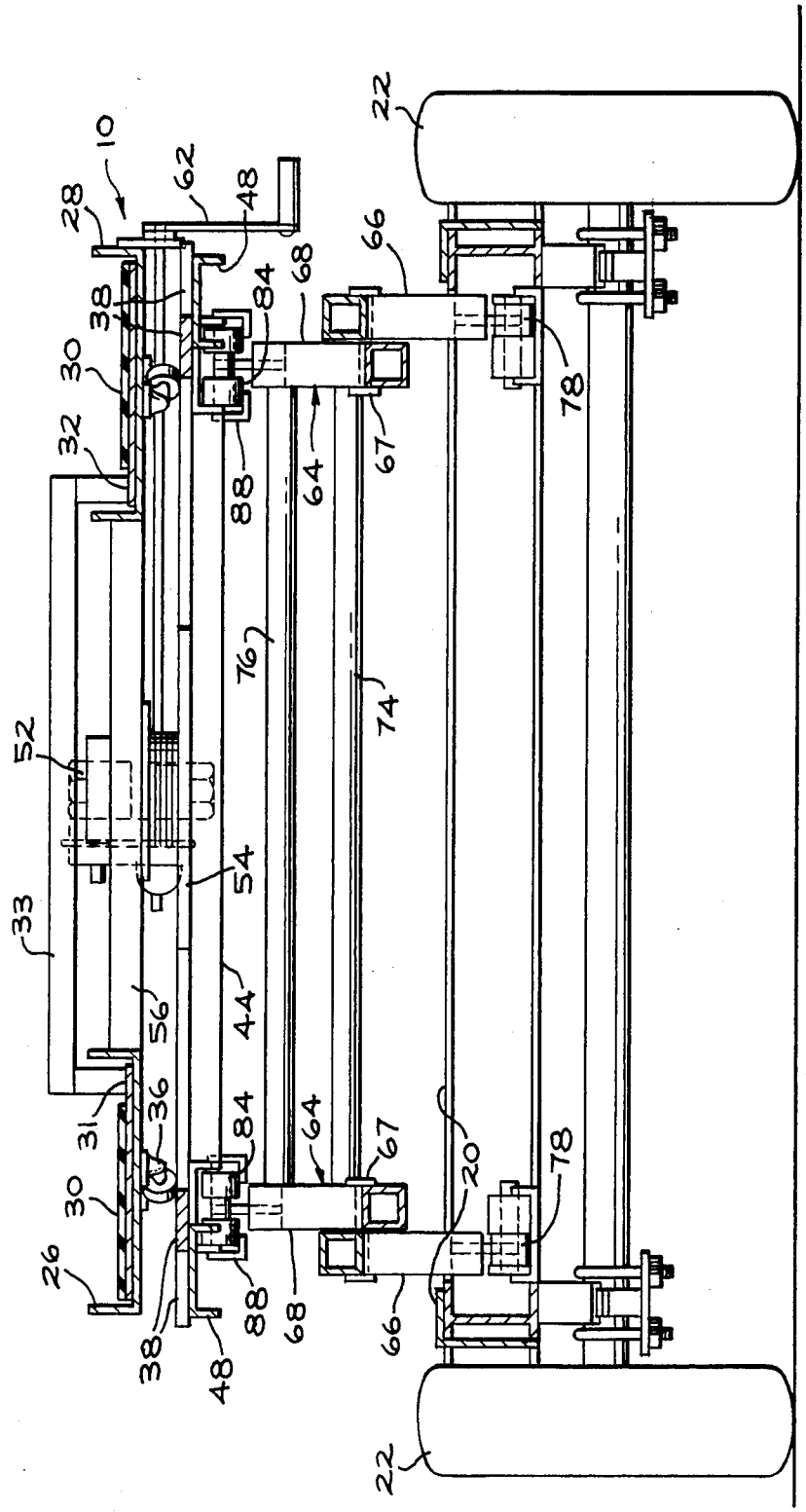

A scissors lift or jack 64 having a first or outer pair of arms 66 pivotally connected at points 67 to a second or inner pair of arms 68 is adapted to extend and contract vertically in response to the operation of a hydraulic cylinder 70 to lift and lower the track 38, pin assembly 52, channels 26 and 28 and associated components. The cylinder 70 is pivotally connected to the chassis 20 and contains a movable piston which is pivotally connected to a cross member 72 which is, in turn, rigidly affixed to the arms 66. Pipes 74 and 76 (See FIGS. 2, 5 and 7) connected between central and upper end portions of the arms 68, respectively, provide reinforcement and stability to the scissors lift 64.

The ends of the arms 66 are pivotally connected to lower and upper rollers 78 and 80, respectively, while the arms 68 are pivotally connected to lower and upper rollers 82 and 84, respectively. Note that the rollers 78 and 80 on opposite ends of the arms 66, while pivotal, are fixed and do not translate or roll along a course as the scissors lift 64 expands and contracts. On the other hand, the rollers 82 and 84 on opposite ends of the arms 68 not only pivot but roll along a course within lower and upper channels 86 and 88 as the lift 64 expands and contracts. The channels 86 are welded to the frame 20. The channels 88 are, in reality, angle brackets welded onto channels and other existing structure to form a course for the rollers 84 and to confine the same which is a function similar to that of the channels 86.

Figure 8:
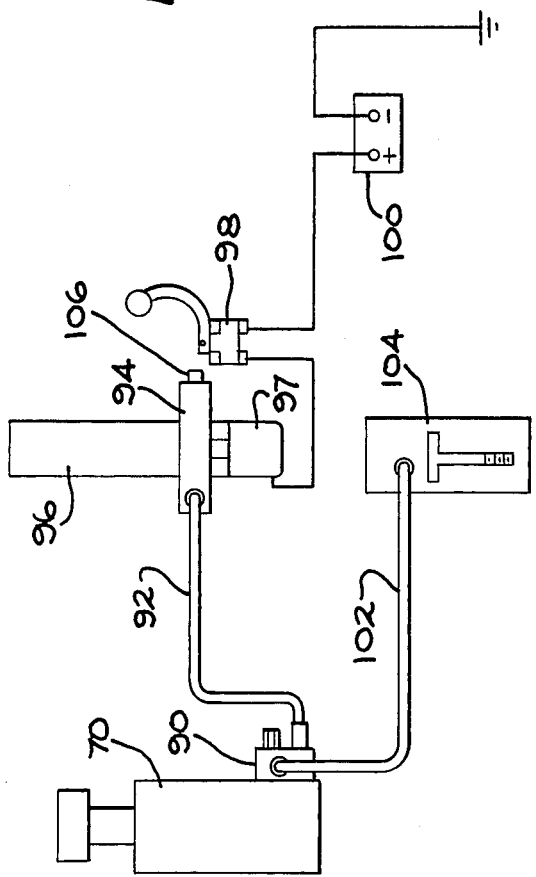
FIG. 8 shows a schematic diagram of an electrically operated hydraulic lift circuit as used in the apparatus of FIG. 1.

Now with reference particularly to FIG. 8, the cylinder 70 is connected through a pilot operated check valve 90 to a hydraulic line 92 and thence to a hydraulic fluid pump 94. A reservoir 96 contains hydraulic fluid for use by the pump 94 and the latter is driven by a 12 volt d.c. motor 97. The motor 97 is connected through a switch 98 to a 12 volt battery 100. A pilot line 102 connects the valve 90 to a hand-operated jack 104. The hydraulic circuit is of conventional type. A safety feature resides in the hand jack 104 which must be pumped to a point wherein pressure in the line 102 is sufficiently high to overcome the effect of pressure in the line 92 to permit the check valve 90 to open and allow fluid to escape the cylinder 70 back to the reservoir 96 when the switch 98 is switched to the down mode. In the down mode, a handle of the switch 98 contacts and depresses a spring return switch to allow fluid to back up from the cylinder 70 through the line 92 to cause the cylinder 70 to retract to lower the load on the channels 26 and 28. Thus, the hydraulic circuit can not be put into the down mode without hand-operating the jack 104 to increase pressure in the pilot line 102.

In operation, the trailer 10, having the channels 26 and 28 aligned as shown in FIG. 4, is backed under a central portion of the double frame 14 of the concrete finishing machine 12 while the latter is set up on a job site. The frame members of the machine 12 are aligned over and along the mats 30 and plates 31 and 32 in the channels 26 and 28. The channels 26 and 28 are then raised by the cylinder 70 until the mats 30 press tightly against the undersides of the frame 14 and lift the rollers 19 on the bottoms of the standards 18 off of the tubular tracks upon which they ride along the top of concrete barricades or the like on the job site. With the bearing pressure removed from the rollers 19, the frame 14 is turned by hand so that the channels 26 and 28 are aligned as shown in FIGS. 1-3 and the rollers 19 are turned sideways and the standards are moved inwardly along the double frame 14 until they are suspended over the frame 20 of the trailer 10 as shown in FIG. 4. The pins 63 are then inserted in registering pairs of the eye hooks 55 and 57 to lock the channels 26 and 28 in the transport position as shown in FIGS. 1-3. A pair of hand jacks 106 and 108 (FIG. 1 only) are then raised to carry the bulk of the weight of the double frame 14 and remove the weight of the latter from bearing upon the scissors jack so that weight can be released from the cylinder 70, whereby the latter can be relaxed. When reaching the job site with the machine 12 on the trailer 10, the pins 63 are removed from the hooks 55 and 57 and the channels 26 and 28 are turned by hand-turning an end of the double frame 14 from the alignment of FIG. 3 to the alignment of FIG. 4. The lift 64 can then be raised if necessary to place the rollers 19 in suspension at a level above where they are to be set upon rails. The trailer 10 is then backed into an approximate center position between the barricades along which the tubular rails lie and upon which the rollers 19 will ride. It will not matter that the trailer is too far to one side or the other between the barricades so long as the rollers 19 are within about eighteen inches of being aligned over the rails because the standards 18 can be moved along outer end portions of the double frame 14 to make up the difference and the worm gear 58 can be adjusted to move the plates 31 and 32 up to about eighteen inches to precisely align the rollers 19 over the rails on which they are to be set.

Although the present invention has been described and shown with respect to specific details of a certain preferred embodiment thereof, it is not intended that such details limit the scope and coverage of this patent otherwise than as is specifically set forth in the following claims.

I claim:

1. An apparatus for lifting, supporting and transporting, in an essentially fully assembled state, a machine having an elongated double frame, said apparatus comprising a chassis, lifting means attached to said chassis for lifting and lowering an elongated double frame machine, a pair of spaced, parallel extending guideways disposed level with one another for supporting the double frame of said machine thereon rotatably attached to an upper end of said lifting means for vertical movement with said lifting means, said guideways also being rotatable relative to said chassis in a horizontal plane at any vertical position of said lifting means, means for locking said guideways in alignment with said chassis to prevent said rotation, a pair of plates slidably disposed in said guideways upon which said double frame is adapted to rest, and means for moving said plates along said guideways to shift the load presented by said double frame.

2. The apparatus of claim 1 wherein said lifting means comprises a scissors lift, and a hydraulic cylinder operatively connected between said chassis and said lift for lifting and lowering said guideways relative to said chassis.

3. The apparatus of claim 1 wherein said locking means comprises a first pair of eye hooks affixed to lower surfaces of forward end portions of said guideways for vertical and rotational movement therewith, a pair of spaced, elongated side members aligned with and over opposite sides of said chassis and connected to said lifting means for vertical movement therewith, a second pair of eye hooks connected to forward ends of said side members, said first pair of eye hooks being registrable over said second pair of eye hooks when said guideways are placed in a preferred rotational alignment relative to said chassis, and means for locking said first pair of eye hooks to said second pair of eye hooks to prevent rotation of said guideways when said guideways are disposed in said preferred rotational alignment.

4. The apparatus of claim 1 wherein said moving means comprises an adjustable worm gear operatively connected to said plates for movement of said plates along said guideways in response to adjustment of said worm gear, and a handle attached to said worm gear for manual adjustment of said worm gear and plates.

5. The apparatus of claim 1 wherein said chassis is mobile.

6. The apparatus of claim 1 further comprising a circular track disposed in a horizontal plane and fixedly connected to an upper end of said lifting means, and a plurality of casters having frames attached to the undersides of said guideways and being rollable upon said track as said guideways rotate in a horizontal plane.

7. An apparatus for lifting, supporting and transporting, in an essentially fully assembled state, a machine having an elongated double frame, said apparatus comprising a mobile chassis, a scissors lift attached to said chassis, a circular track attached to said lift for vertical movement therewith, a pair of spaced, parallel extending guideways rotatably disposed over said track and rigidly connected together for both vertical and rotational movement in unison, said guideways being disposed level with one another and being rotatably movable at any position of said lift, a plurality of casters connected to the undersides of said guideways and disposed on said track for rolling upon said track as said guideways rotate in a horizontal plane, a hydraulic cylinder connected between said chassis and lift for expanding said lift to raise said guideways, a pair of spaced plates slidably disposed in said guideways and rigidly connected together for sliding movement in unison, an adjustable worm gear operatively connected to said plates for slidably moving said plates along said guideways for shifting the load represented by a machine having a double frame when resting thereon, and means for locking said guideways in alignment with said chassis to prevent rotation of said guideways relative to said chassis.

* * * * *